June 29, 1937.  H. NUTT  2,085,167

CLUTCH PLATE

Filed Oct. 27, 1933  2 Sheets-Sheet 1

INVENTOR
Harold Nutt
BY Wm. O. Belt
ATTORNEY

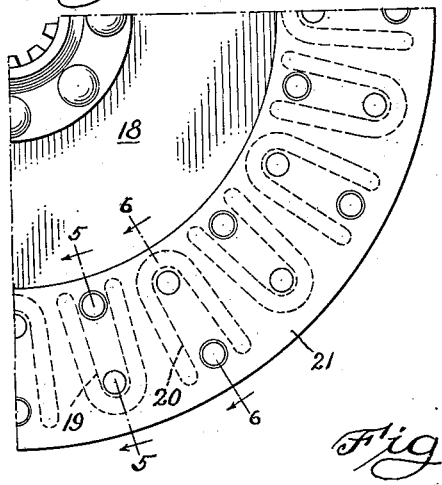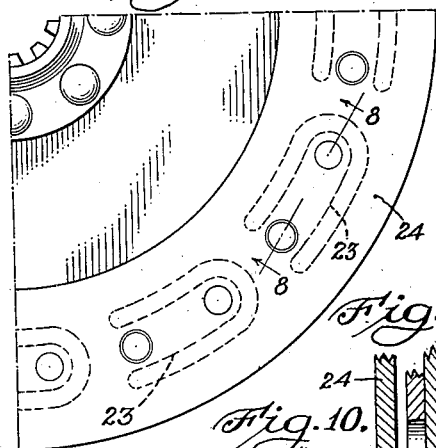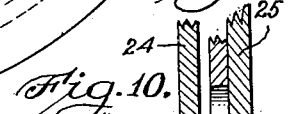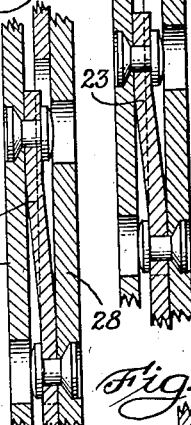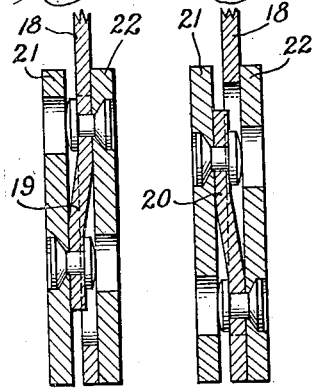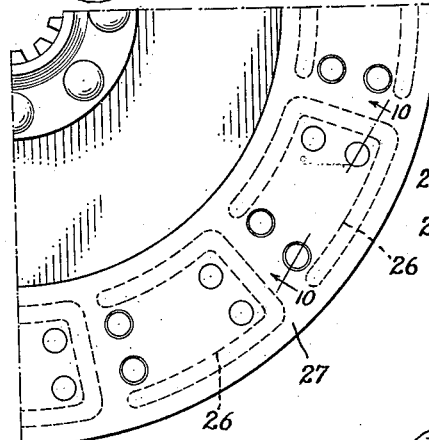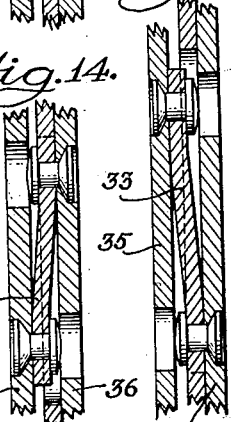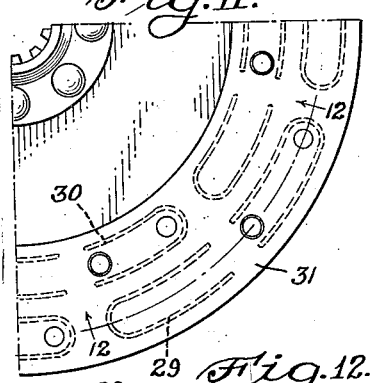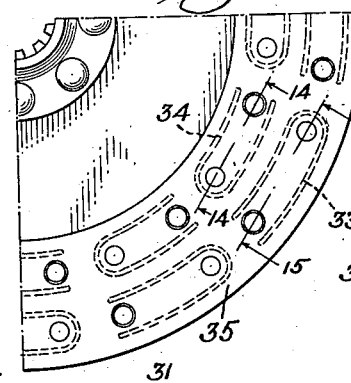

Patented June 29, 1937

2,085,167

UNITED STATES PATENT OFFICE 2,085,167

CLUTCH PLATE

Harold Nutt, Chicago, Ill., assignor, by mesne assignments, to Borg-Warner Corporation, Chicago, Ill., a corporation of Illinois Application October 27, 1933, Serial No. 695,388

7 Claims. (Cl. 192—107)

This invention relates to friction clutches and more especially to the clutch or driven plate which is interposed between two parts of a driving member and is adapted to be gripped by said parts to impart motion from the driving member to a driven shaft on which the clutch plate is mounted. The invention is particularly useful in friction clutches for automobiles but is not limited thereto and may be used in other clutch assemblies with satisfactory results.

Clutch plates have heretofore been made in various ways, with and without peripherally disposed sectors, and friction facings have been fastened on opposite sides of the plate in different ways. Operation of the clutch creates friction heat which causes the metal clutch plate to expand to a much greater extent than the non-metallic friction facings which expand but slightly and practically not at all. This unequal expansion has caused buckling, bulging or other distortion of the plate and facings because they have been fastened together at infrequent and more or less irregular intervals, and this has resulted sometimes in lessening the efficiency of the clutch and causing the facings to wear unevenly and too rapidly.

The principal object of this invention is to prevent distortion of the facings from unequal expansion of the plate and facings and to fasten the facings to the plate at more frequent intervals than has been done heretofore.

In clutch plates provided at their peripheries with sectors it has been the practice to fasten each facing to alternate sectors only, with the result that distortion of the plate and sectors has been augmented by reason of the widely separated fastenings, and it is an object of my invention to enable each facing to be fastened to each sector thereby materially increasing the number of fastenings and disposing them close together and avoiding the distortion heretofore resulting from unequal expansion of the facings and plate.

In the accompanying drawings illustrating selected embodiments of the invention

Fig. 1 is a plan view of a clutch plate having peripheral sectors with the invention embodied therein;

Figs. 2 and 3 are enlarged detail sectional views on the lines 2—2 and 3—3 respectively of Fig. 1;

Fig. 4 is a plan view of part of a clutch plate showing another embodiment of the invention;

Figs. 5 and 6 are enlarged detail sectional views on the lines 5—5 and 6—6 respectively of Fig. 4;

Fig. 7 is a plan view of part of a clutch plate showing another embodiment of the invention;

Fig. 8 is an enlarged detail sectional view on the line 8—8 of Fig. 7;

Fig. 9 is a plan view of part of a clutch plate showing another embodiment of the invention;

Fig. 10 is an enlarged detail sectional view on the line 10—10 of Fig. 9;

Fig. 11 is a plan view of part of a clutch plate showing another embodiment of the invention;

Fig. 12 is an enlarged detail sectional view on the line 12—12 of Fig. 11;

Fig. 13 is a plan view of part of a clutch plate showing another embodiment of the invention;

Figs. 14 and 15 are enlarged detail sectional views on the lines 14—14 and 15—15 respectively of Fig. 13.

Figure 1:
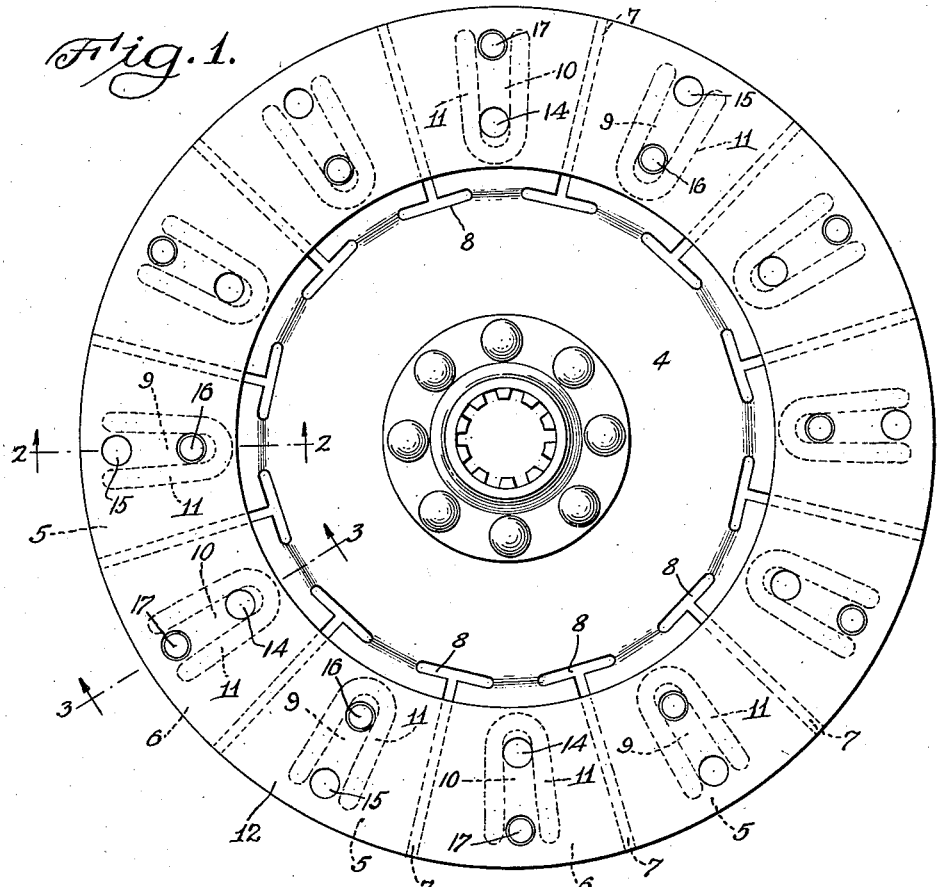
Figure 2:
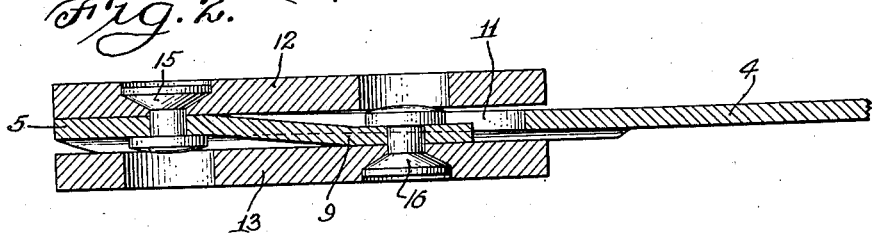
Figure 3:
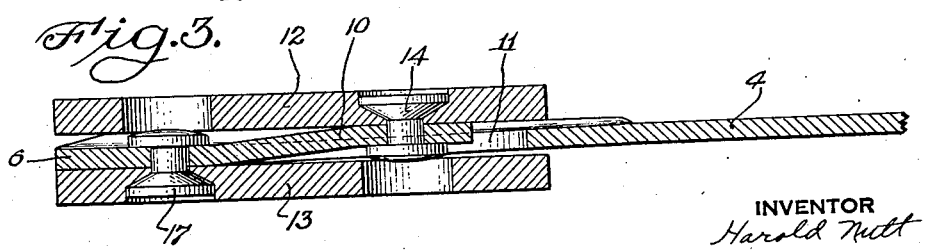

Referring to Figs. 1-3 of the drawings, the clutch plate 4 is divided into a plurality of sectors 5 and 6 by radial slots 7 which extend through the periphery of the plate. At their inner ends the radial slots connect with transverse slots 8 to form T-shaped slots separating and defining the sectors. Each of the sectors 5 and 6 is bent transversely into the shape of a section of a frustum of a conical shell, the sectors 5 are bent to offset the side edges thereof on one side of the plate and the sectors 6 are bent transversely to offset the side edges thereof on the other side of the plate. The sectors 5 have radially disposed and inwardly directed tongues 9 and the sectors 6 also have radially disposed and inwardly directed tongues 10 formed by cutting therein slots 11 which may be generally described as U-shaped. The sectors 5 are bodily bent at their juncture with the body of the plate between the transverse slots 8 on one side of the plate and the sectors 6 are similarly bent on the opposite side of the plate. The side edges of the sectors are bent more at their outer ends than at their inner ends and the side edges of each group of sectors lie in the same plane so that the friction facings 12 and 13 applied on the plate will be parallel to each other. The tongues 10 of the sectors 6 and the tongues 9 of the sectors 5 are bent so that they will contact the facing opposite that which contacts the central portion of each sector. The facing 12 is fastened on one side of the plate to the end of the tongues 10, Fig. 3, by rivets 14 and to the base of the tongues 9, Fig. 2, by rivets 15. The other friction facing 13 is fastened on the other side of the plate to the end of the tongues 9, Fig. 2, by rivets 16 and to the base of the tongues 10, Fig. 3, by rivets 17. Thus each facing is fastened to each sector of the plate, one facing to the outer end of the tongue and the other facing to the base of the tongue, and these fastenings are reversed in adjacent sectors. The fastenings of the facings to each sector are located radially of the plate. The radial fastenings are arranged in pairs one pair for each sector, and the pairs are comparatively close together circumferentially of the plate. The number of sectors in a plate may be varied according to the size of the plate, or for other reasons, but in order to obtain the advantageous results of the provision of sectors they will be sufficiently numerous that the pairs of facing fastenings will be located at comparatively short intervals circumferentially of the plate and hold the facings in parallel relation and against distortion due to unequal expansion of plate and facings.

While I have shown the invention embodied in a plate divided peripherally into sectors in Figs. 1-3, it is also applicable and advantageous in plates not divided into sectors as shown in Figs. 4-15 and referring to Figs. 4-6, the plate 18 is provided with outwardly directed tongues 19 and inwardly directed end of the tongues 20 which are radially disposed and bent to one side of the plate. The facing 21 is arranged on one side of the plate and riveted to the tongues near the outer end portions thereof; the facing 22 is arranged on the other side of the plate and is riveted to the tongues at or about the base thereof. The rivets engaging each tongue are disposed radially of the plate. In this embodiment the facing 21 is yieldingly supported by the tongues on one side of the plate and the facing 22 is supported flat against the other side of the plate.

In Figs. 7 and 8, the tongues 23 extend circumferentially of the plate in the same direction and are bent outwardly on one side of the plate. The facing 24 is riveted to the outer end portions of the tongues and the facing 25 is riveted to the plate at the base of the tongues. In this embodiment also the facing 24 is yieldingly supported by the tongues on one side of the plate and the facing 25 is supported flat against the other side of the plate, the rivets all being located in alignment circumferentially of the plate.

In Figs. 9 and 10, wide tongues 26 are provided and the facing 27 is fastened by two rivets disposed radially of the plate at the end portion of each tongue and the facing 28 is fastened by two rivets disposed radially of the plate at the base of each tongue. The facing 26 is yieldingly supported by the tongues on one side of the plate and the facing 28 is supported flat against the other side of the plate.

In Figs. 11 and 12, there is an outer circumferential series of tongues 29 and an inner circumferential series of tongues 30, the tongues in one series being located opposite to the tongues in the other series so that they will be arranged in series about the plate. Adjacent tongues in each series are oppositely directed and the tongues in each radial pair are oppositely directed. A facing 31 is riveted to the end portions of alternate tongues in each series and the facing 32 is riveted to the base of the same tongues. These tongues are alternately disposed in the outer and inner circumferentially disposed series of tongues and on each series of radially disposed tongues one tongue is fastened to the facings and the other tongue is unfastened. The tongues are all bent to one side of the plate to yieldingly support the facing 31 whereas the facing 32 is supported flat against the other side of the plate.

In Figs. 13-15, there is an outer circumferential series of tongues all extending in the same direction and an inner circumferential series of tongues all extending in the opposite direction, the tongues in the outer series being located opposite the tongues in the inner series to dispose the tongues of the two series in pairs radially of the plate. The facing 35 is riveted to the outer end portions of all of the tongues and is yieldingly supported thereby on one side of the plate, and the facing 36 is riveted to the base portion of all of the tongues and is supported thereby flat against the other side of the plate.

In Figs. 4, 9 and 13, there are pairs of rivets with the rivets in each pair disposed radially of the plate, as in Fig. 1, and in Figs. 7 and 11, the rivets are arranged in pairs extending circumferentially of the plate, but in each embodiment each tongue that is provided with fastening devices is fastened to both facings and the arrangement is such that the fastenings are closely disposed to hold the facings and the plate against distortion due to thermal conditions of use. The facings are mounted on the plate in parallel relation, as shown in all forms illustrated, whereby full engagement of both facings is obtained on initial application of clutching pressure.

The invention provides a clutch plate of simple and novel construction which will take hold smoothly and evenly with full contact throughout the area of both facings and will avoid distortion and irregular wear of the facings and prolong the life of the plate. The close arrangement of the fastenings of the facings to the plate produces a substantially uniform distribution of the clamping pressure and the cushion resistance and insures that the facings will be rigidly held to the plate and prevented from buckling or bulging or other distortion, thereby promoting the efficiency of the clutch.

I have shown several selected embodiments of the invention with both facings yieldingly supported and with one facing yieldingly supported and the other rigidly supported, and with various forms and arrangements of the tongues, and I may embody the invention in other types of cushion plates for clutches and make any changes that may be necessary or desirable to adapt the invention for different clutch assemblies or for other purposes within the scope of the following claims.

I claim:

1. A clutch plate having a plurality of circumferentially directed tongues, friction facings each lying wholly within a single plane on the sides of the plate, and radially disposed means fastening both of said facings to the same tongues.

2. A clutch plate having a plurality of continuous slots therein forming tongues and said tongues being bent out of the plane of the plate, a friction facing lying wholly within a single plane and supported on said tongues at one side of the plate and spaced thereby from the plane of the plate, another facing on the other side of the plate, and means fastening both facings to the same tongues.

3. A clutch disc comprising, a hub member, a substantially circular plate mounted concentrically upon said hub member, a friction facing disposed upon one side of said plate, a plurality of rivets securing said facing against movement relative to said plate and arranged in substantially circumferential array, means carried by said plate presenting yieldable facing contacting and supporting portions extending in opposite circumferential directions from each of said rivets and spaced away from the plane of said plate, a second friction facing located upon said yieldable supporting portions, and rivets securing one only of each pair of said oppositely extending yieldable portions to said second facing.

4. A clutch disc, as defined in claim 3, wherein the yieldable supporting portions which are secured to the second friction facing by rivets all extend in the same direction circumferentially relative to the adjacent rivet securing the plate and first friction facing against movement relative.

5. A clutch disc, as defined in claim 3, wherein the distances between the points of engagement of the yieldable portions and the second friction facing and the adjacent rivet securing the first friction facing against movement relative to the plate are of different dimensions.

6. A clutch disc comprising, a hub member, a substantially circular plate concentrically mounted upon said hub, a friction facing disposed upon one side of said plate, means carried by said plate presenting yieldable facing supporting portions spaced away from the plane of said plate and all extending circumferentially in the same direction, a plurality of rivets arranged in groups, the rivets of each group being disposed along radii of the plate securing said friction facing to said plate, said rivets extending through the adjacent of said yieldable portions at points near the body of said plate, a second friction facing disposed upon said yieldable supporting portions, and other rivets arranged in groups, the rivets of each group lying along lines parallel with radii of said plate securing said second friction facing to said yieldable portions adjacent to the free ends thereof.

7. A clutch plate, cushion tongues formed within the peripheral portion of said plate and each extending away from the plane of the plate, friction facings on each side of the plate and each lying wholly within a single plane, and means fastening both of said facings to each of the said tongues.

HAROLD NUTT.